(12) United States Patent
Lee

(10) Patent No.: US 7,382,904 B2
(45) Date of Patent: Jun. 3, 2008

(54) SECURITY SYSTEM AND SECURITY METHOD USING FINGERPRINTS

(75) Inventor: Woo-hyoung Lee, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 803 days.

(21) Appl. No.: 10/691,568

(22) Filed: Oct. 24, 2003

(65) Prior Publication Data

US 2004/0091138 A1 May 13, 2004

(30) Foreign Application Priority Data

Nov. 5, 2002 (KR) ...................... 10-2002-0068261

(51) Int. Cl.
*G06K 9/00* (2006.01)

(52) U.S. Cl. ..................................... 382/124

(58) Field of Classification Search ............... D14/384; 340/5.53, 5.83; 382/124
See application file for complete search history.

(56) References Cited

U.S. PATENT DOCUMENTS

| | | | |
|---|---|---|---|
| 4,151,512 A * | 4/1979 | Riganati et al. | ............ 382/125 |
| 5,764,789 A | 6/1998 | Pare et al. | |
| 5,933,515 A | 8/1999 | Pu et al. | |
| 6,198,836 B1 | 3/2001 | Hauke | |
| 6,229,906 B1 | 5/2001 | Pu et al. | |
| 6,373,967 B2 | 4/2002 | Pu et al. | |
| 2001/0049785 A1 | 12/2001 | Kawan et al. | |
| 2002/0122026 A1* | 9/2002 | Bergstrom | .................... 345/157 |
| 2003/0044051 A1* | 3/2003 | Fujieda | ........................ 382/124 |
| 2005/0109836 A1* | 5/2005 | Ben-Aissa | .................. 235/380 |

FOREIGN PATENT DOCUMENTS

| | | |
|---|---|---|
| EP | 2000076450 | 3/2000 |
| EP | 12655121 A2 * | 11/2002 |
| JP | 6-208612 | 7/1994 |
| WO | WO 01/09847 A1 | 2/2001 |
| WO | WO 01/95804 A1 | 12/2001 |

OTHER PUBLICATIONS

International Search Report for application No. 01/01838 dated Oct. 8, 2001.

* cited by examiner

*Primary Examiner*—Matthew C. Bella
*Assistant Examiner*—G. F. Cunningham
(74) *Attorney, Agent, or Firm*—Staas & Halsey LLP

(57) ABSTRACT

A security system using fingerprints, including a fingerprint scan part creating a fingerprint image when a finger contacts the fingerprint scan part; a fingerprint image storing part storing representative reference fingerprint images and at least one auxiliary reference fingerprint image for registered users; and a control part determining whether one of the representative reference fingerprint images matches a first input fingerprint image input through the fingerprint scan part, reading auxiliary reference fingerprint images corresponding to a matching representative reference fingerprint image, and comparing other fingerprint images input after the first input fingerprint image with the auxiliary reference fingerprint images to determine user authentication.

14 Claims, 7 Drawing Sheets

SECURITY SYSTEM AND SECURITY METHOD USING FINGERPRINTS

CROSS-REFERENCE TO RELATED APPLICATIONS

This application claims the benefit of Korean Application No. 2002-68261, filed Nov. 5, 2002, in the Korean Intellectual Property Office, the disclosure of which is incorporated herein by reference.

BACKGROUND OF THE INVENTION

1. Field of the Invention

The present invention relates to a security system and a security method using fingerprints, and, more particularly, to a security system and a security method using multiple fingerprint images having a pre-established input order.

2. Description of the Related Art

Security systems have been developed that prevent unauthorized users from gaining access to an area or to information stored in a computer.

As an example, biometric technologies pre-register and store fingerprints, a shape of the iris, or voice signals as identification data.

A conventional security system using fingerprints pre-registers a plurality of fingerprints using a fingerprint recognition apparatus. If a fingerprint of a person desiring access authorization matches a registered fingerprint, then access is authorized. Otherwise, access is denied.

If the conventional security system has a low FAR (False Acceptance Rate) and a high FRR (False Rejection Rate), registered users may be denied access, requiring additional attempts to gain access. However, if the security system ]has a low FRR, the FAR increases and thus unregistered users may be given access authorization. Thus, a trade-off exists between convenience and security.

SUMMARY OF THE INVENTION

It is an aspect of the present invention to provide a system and a method using fingerprints to enable fast user authentication by comparing an initial predetermined input fingerprint image with multiple stored representative reference fingerprint images and, if a match occurs, sequentially performing a comparison of other predetermined or auxiliary fingerprint images.

Additional aspects and/or advantages of the invention will be set forth in part in the description that follows and, in part, will be obvious from the description, or may be learned by practice of the invention.

To achieve the above and/or other aspects of the present invention, there is provided a security system using fingerprints, including a fingerprint scan part creating a fingerprint image when a finger contacts the fingerprint scan part; a fingerprint image storing part storing representative reference fingerprint images and at least one auxiliary reference fingerprint image for registered users; and a control part determining whether one of the representative reference fingerprint images matches a first input fingerprint image input through the fingerprint scan part, reading auxiliary reference fingerprint images corresponding to a matching representative reference fingerprint image, and comparing other fingerprint images input after the first input fingerprint image with the auxiliary reference fingerprint images to determine user authentication.

The control part displays an error message when the first input fingerprint image does not match any of the representative reference fingerprint images in the fingerprint image storing part.

The security system using fingerprints further includes a fingerprint registering part sequentially storing fingerprint images input through the fingerprint scan part by an unregistered user in the fingerprint image storing part, and displaying the stored fingerprint images of the unregistered user for the unregistered user to select one of the stored fingerprint images as the representative reference fingerprint image.

The fingerprint registering part assigns sequential order values to the unregistered fingerprint images input through the fingerprint scan part and stores the sequential order values with the input fingerprint images of the unregistered user in the fingerprint image storing part.

The fingerprint scan part may include multiple fingerprint input keys having order values sequentially selected by the unregistered user; and the fingerprint registering part stores a combination of input fingerprint images contacting the fingerprint input keys selected by the unregistered user and the order values in the fingerprint image storing part.

The fingerprint registering part displays a screen to set the input order of the auxiliary reference fingerprint images; and the control part stores the input order of the auxiliary reference fingerprint images in the fingerprint image storing part.

To achieve the above and/or other aspects of the present invention, there is provided a security method using fingerprints, including storing representative reference fingerprint images and at least one auxiliary reference fingerprint image, according to registered users; receiving a first input fingerprint image for authentication of a user; determining whether one of the stored representative reference fingerprint images matches the first input fingerprint image reading auxiliary reference fingerprint images corresponding to a matching representative reference fingerprint image; receiving additional fingerprint images sequentially input by the user; and determining whether the user is authenticated by respectively comparing the additional input fingerprint images with the corresponding auxiliary reference fingerprint images.

The security method using fingerprints further includes displaying an error message when the first input fingerprint image does not match any of the representative reference fingerprint images.

The security method using fingerprints further includes receiving fingerprint images of an unregistered user; and assigning order values to the fingerprint images sequentially input by the unregistered user, and storing the order values with the input fingerprint images.

The security method using fingerprints further includes displaying a screen for the unregistered user to select one of the stored representative reference fingerprint images as the representative reference fingerprint image.

The security method using fingerprints further includes displaying a screen to select and assign order values to the auxiliary reference fingerprint images; and storing the selected auxiliary reference fingerprint image and the order values with the selected representative reference fingerprint image.

The security method using fingerprints further includes selecting sequentially two or more fingerprint input keys having order values selected by the unregistered user; storing a combination of fingerprint images input through the selected fingerprint input keys and the order values; and determining authentication of a user requesting authentication by determining whether an order of the fingerprint images input through the fingerprint input keys match the selected order values and whether the input fingerprint images match the stored auxiliary reference fingerprint images.

To achieve the above and/or other aspects according to the present invention, there is provided a fingerprint security method, including receiving and storing fingerprint images for each finger of one or more unregistered users; displaying the stored fingerprint images for the unregistered user to select one of the stored fingerprint images as a representative reference fingerprint image; displaying the stored fingerprint images for the unregistered user to select and order one or more of the stored fingerprint images as ordered auxiliary reference fingerprint images; registering the user with the corresponding representative reference fingerprint image and the auxiliary reference fingerprint images; receiving a first fingerprint image from a user to be authenticated; determining whether the first fingerprint image matches any of a plurality of stored representative reference fingerprint images for a plurality of registered users; receiving, when the first fingerprint image matches one of the stored representative reference fingerprint images, additional fingerprint images sequentially input by the user to be authenticated; and determining whether each of the additional fingerprint images matches auxiliary reference fingerprint images corresponding to the representative reference fingerprint image that matches the first fingerprint image, and whether the additional fingerprint images are input according to the selected order of the corresponding auxiliary reference fingerprint images.

These together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the present invention will become apparent and more readily appreciated from the following description of preferred embodiments, taken in conjunction with the accompany drawings, of which.

DETAILED DESCRIPTION OF THE PREFERRED EMBODIMENT

Figure 1:
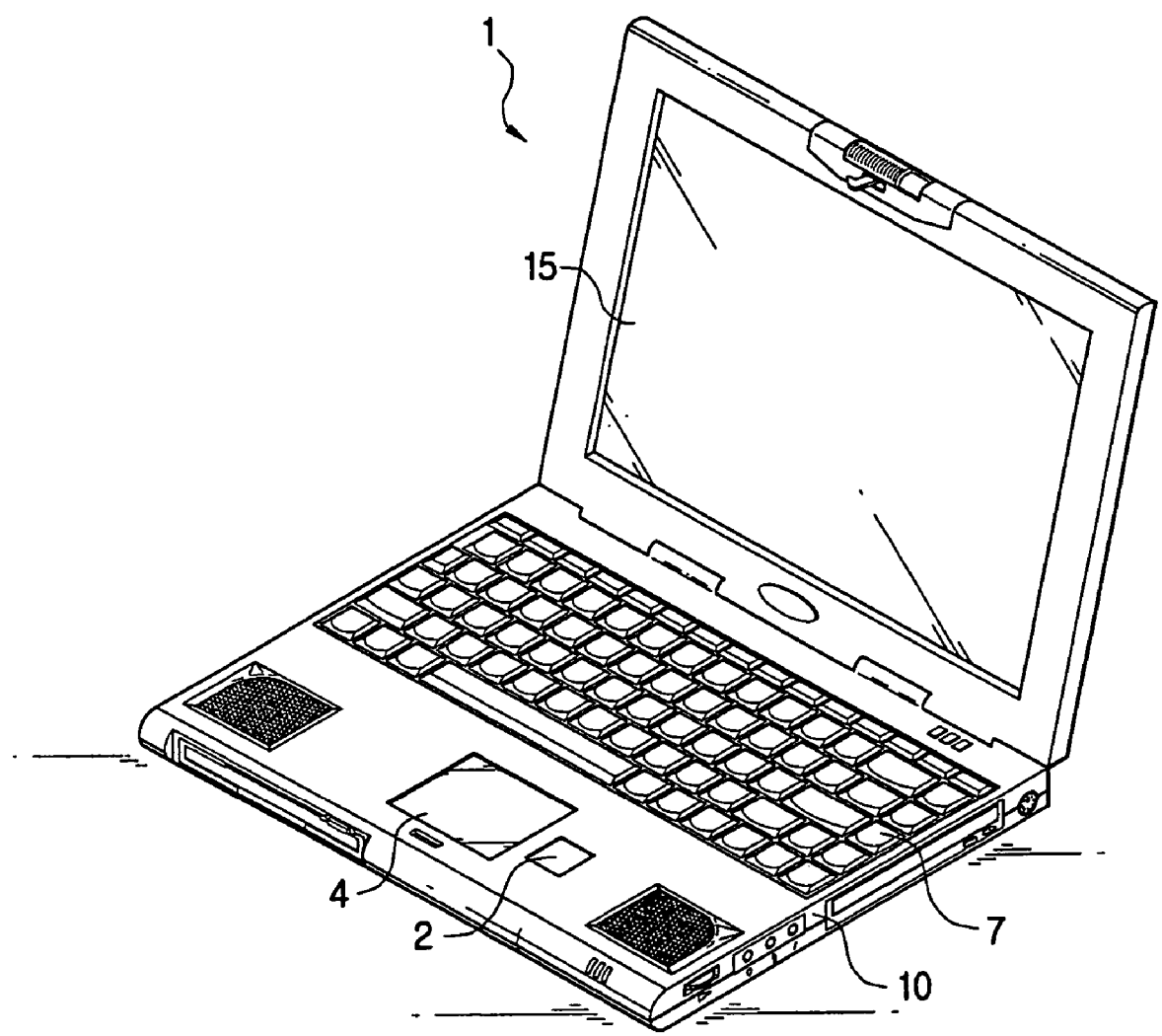
FIG. 1 is a perspective view illustrating a portable computer with a security system using fingerprints according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 2:
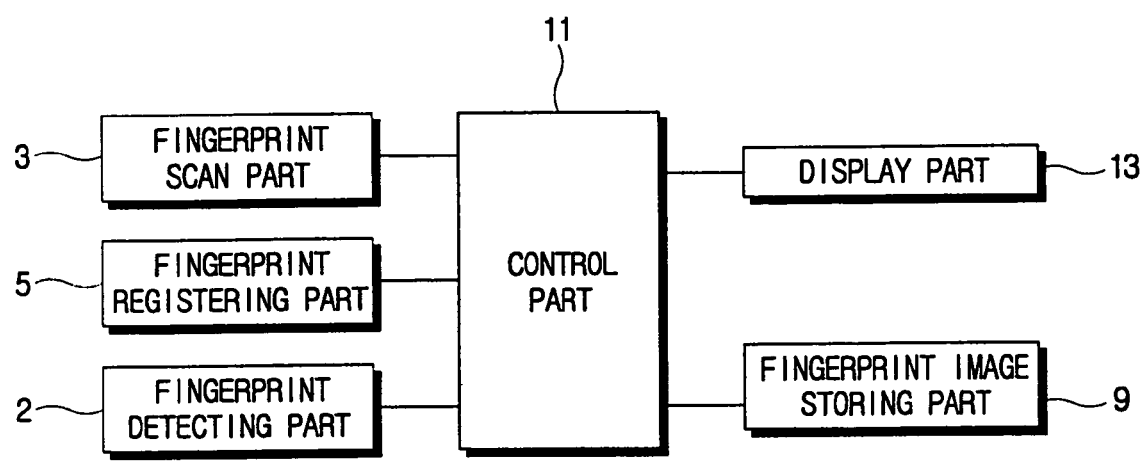
FIG. 2 is a control block diagram of the security system of FIG. 1.

FIG. 1 is a perspective view illustrating a portable computer with a security system using fingerprints according to an embodiment of the present invention, and FIG. 2 is a control block diagram of the security system of FIG. 1. A security system using fingerprints according to the present invention is described below, as applied to a portable computer. As shown in FIG. 1 and FIG. 2, a portable computer 1 includes a system body 10 and a liquid crystal display (LCD) part 15 joined to the system body 10. The system body 10 includes a key input part 7, a fingerprint detecting part 2 having multiple contact sensors, and a touch pad 4.

The security system using fingerprints is implemented as a security program for user authentication. As shown in the control block diagram of FIG. 2, the security system includes a fingerprint scan part 3 generating an image on the basis of a detection signal output from the fingerprint detecting part 2; a fingerprint image storing part 9 storing, for each user, a representative reference fingerprint image and at least one auxiliary reference fingerprint image; and a fingerprint registering part 5 sequentially receiving multiple unregistered images of fingerprints, selecting and ordering one or more of the images as auxiliary reference fingerprint images, and then storing the multiple images in the fingerprint image storing part 9. When a representative reference fingerprint image matches a fingerprint image input using the fingerprint detecting part 2, a control part 11 reads corresponding auxiliary reference fingerprint images of the user associated with the representative reference fingerprint image, and then respectively compares each auxiliary reference fingerprint image with additional fingerprint images input by the user requesting access authorization to determine whether the user is authenticated. A display part 13 displays whether the user is authenticated, and can be provided in the LCD part 15.

When a user initially registers fingerprint images, the fingerprint registering part 5 provides an order value between 0 and 9 to the fingerprint images supplied from the fingerprint scan part 3 to correspond to each of the user's ten fingers that contact the fingerprint detecting part 2 sequentially from left to right and then stores the fingerprint images in the fingerprint image storing part 9 according to a user identification (ID). The fingerprint registering part 5 then displays a screen 20 for the user to set the representative reference fingerprint image (refer to FIG. 5), described below, and a screen 30 for setting the auxiliary reference fingerprint images and the input order thereof (refer to FIG. 6) described below. The fingerprint registering part 5 then stores the input order information, which includes order values for the representative reference fingerprint images, and the auxiliary reference fingerprint image images, in the fingerprint image storing part 9.

Thus, the control part 11 compares an input fingerprint image from the fingerprint scan part 3 for a user requesting access, with the representative reference fingerprint images and, if a match occurs, corresponding auxiliary reference fingerprint images and the comparison input order information are read from the fingerprint image storing part 9. The user requesting access then inputs additional fingerprint images. The control part 11 determines whether to authenticate a user by analyzing whether the additional fingerprint images are input according to the input order information of the auxiliary reference fingerprint images.

Figure 3:
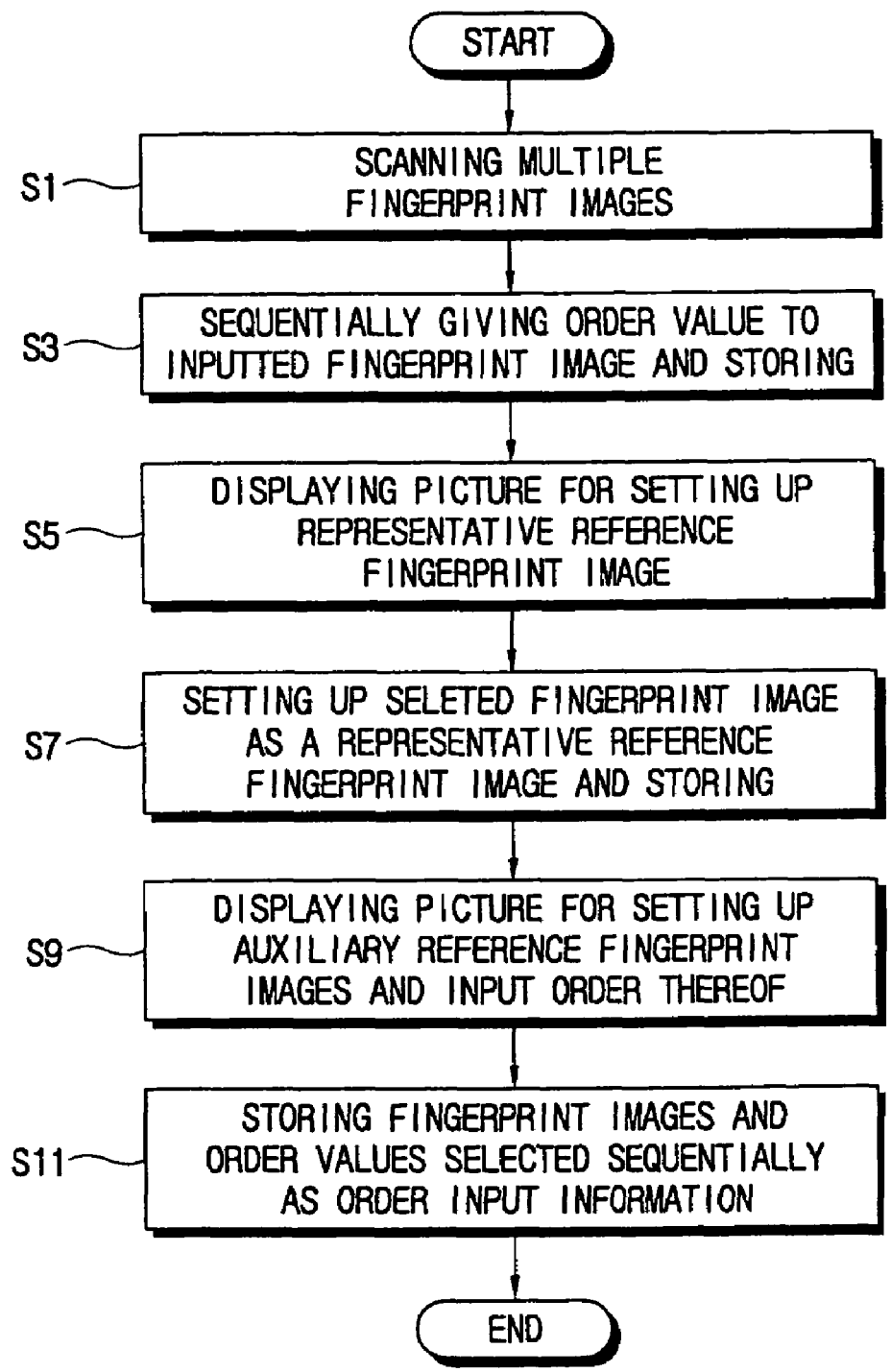
FIG. 3 is a flow diagram illustrating control of registration of fingerprint images by a security method using fingerprints according to the embodiment of the present invention.

FIG. 3 is a flow diagram illustrating control of registration of the fingerprint images according to the present invention. Multiple fingerprint images of a user are scanned at S1 in a specific order and then input. The fingerprint registering part 5 provides an order value at S3 to the fingerprint images sequentially input and then stores the fingerprint images in the fingerprint image storing part 9. The screen 20 for setting the representative reference fingerprint image (refer to FIG. 5) is displayed at S5 on the display part 13. A fingerprint image selected by the user is then set at S7 as a representative reference fingerprint image and stored. The screen 30 for setting the auxiliary reference fingerprint images and the input order thereof (refer to FIG. 6) is displayed at S9 to allow the user to select multiple auxiliary reference fingerprint images with a specific order. At this point, the fingerprint registering part 5 stores at S11 the auxiliary reference fingerprint images and the order values thereof in the fingerprint image storing part 9 as the input order information.

Figure 4:
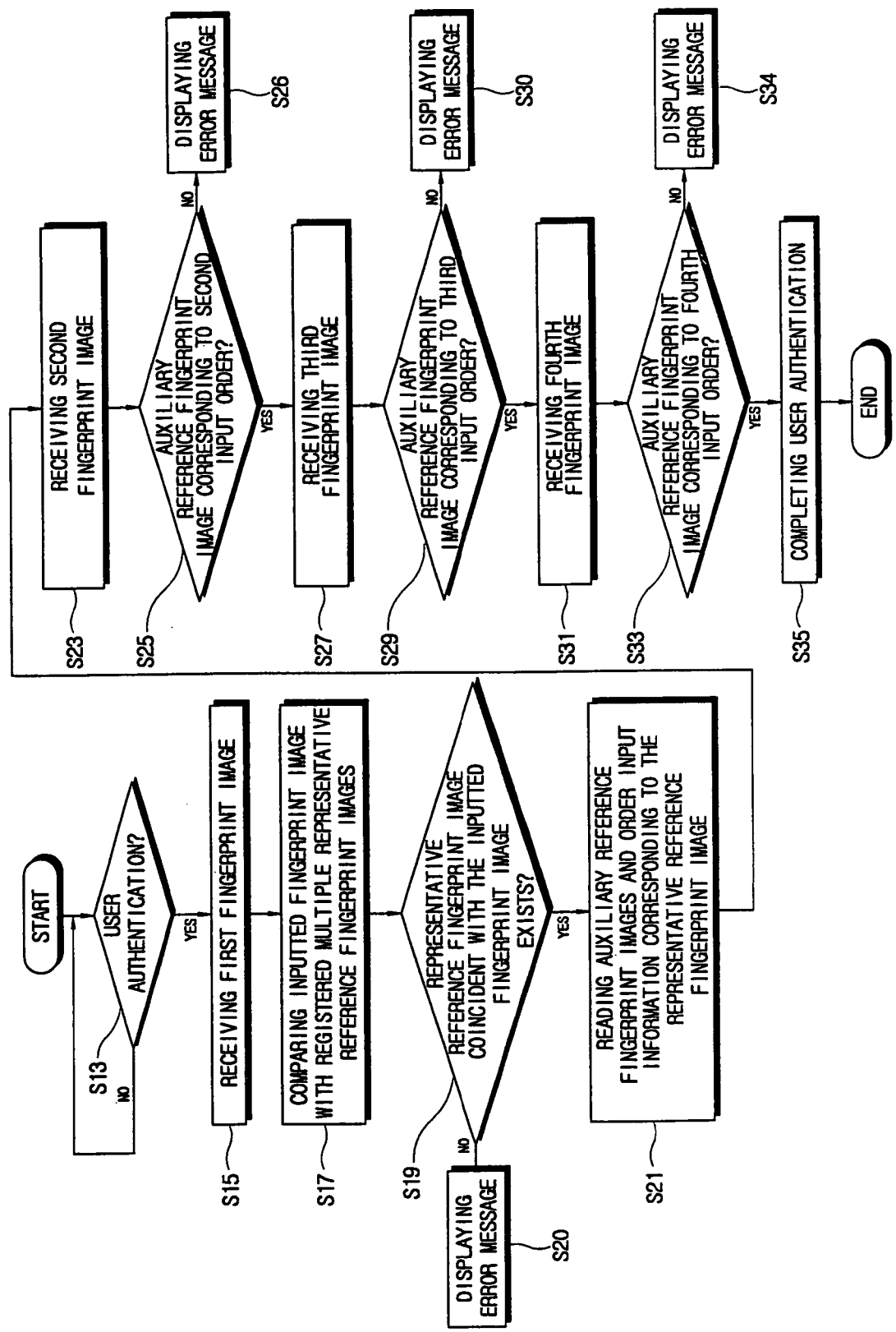
FIG. 4 is a flow diagram illustrating control of identification of a user by a security method using fingerprints according to the embodiment of the present invention.

FIG. 4 is a flow diagram illustrating control of identification of a user according to the present invention. To authenticate a user at S13, the control part 11 receives a first input fingerprint image at S15 and then compares at S17 the first input fingerprint image with the multiple registered representative reference fingerprint images. The control part 11 determines at S19 whether one of the representative reference fingerprint image matches the input fingerprint image and then, when a representative reference fingerprint image matches the input fingerprint image, reads at S21 the auxiliary reference fingerprint images corresponding to the matching representative reference fingerprint image. When there are, for example, four auxiliary reference fingerprint images, then whenever a second, third, or fourth fingerprint image is input through the fingerprint scan part 3, the control part 11 determines at S23 through S35 whether the fingerprint images are input in order based on the input order information stored in the fingerprint image storing part 9, and then determines whether the user is authenticated at S35. When the input fingerprint image is compared with the representative reference fingerprint images at S19 and is not coincident with the representative reference fingerprint images, an error message is displayed by the display part 13 at S20. In determining whether the second through fourth fingerprint images input through the fingerprint scan part 3 are input in order at S25, S29, and S33, if one of the second through fourth fingerprint images is not input in order, the display part 13 displays an error message at S26, S30, and S34.

Figure 5:
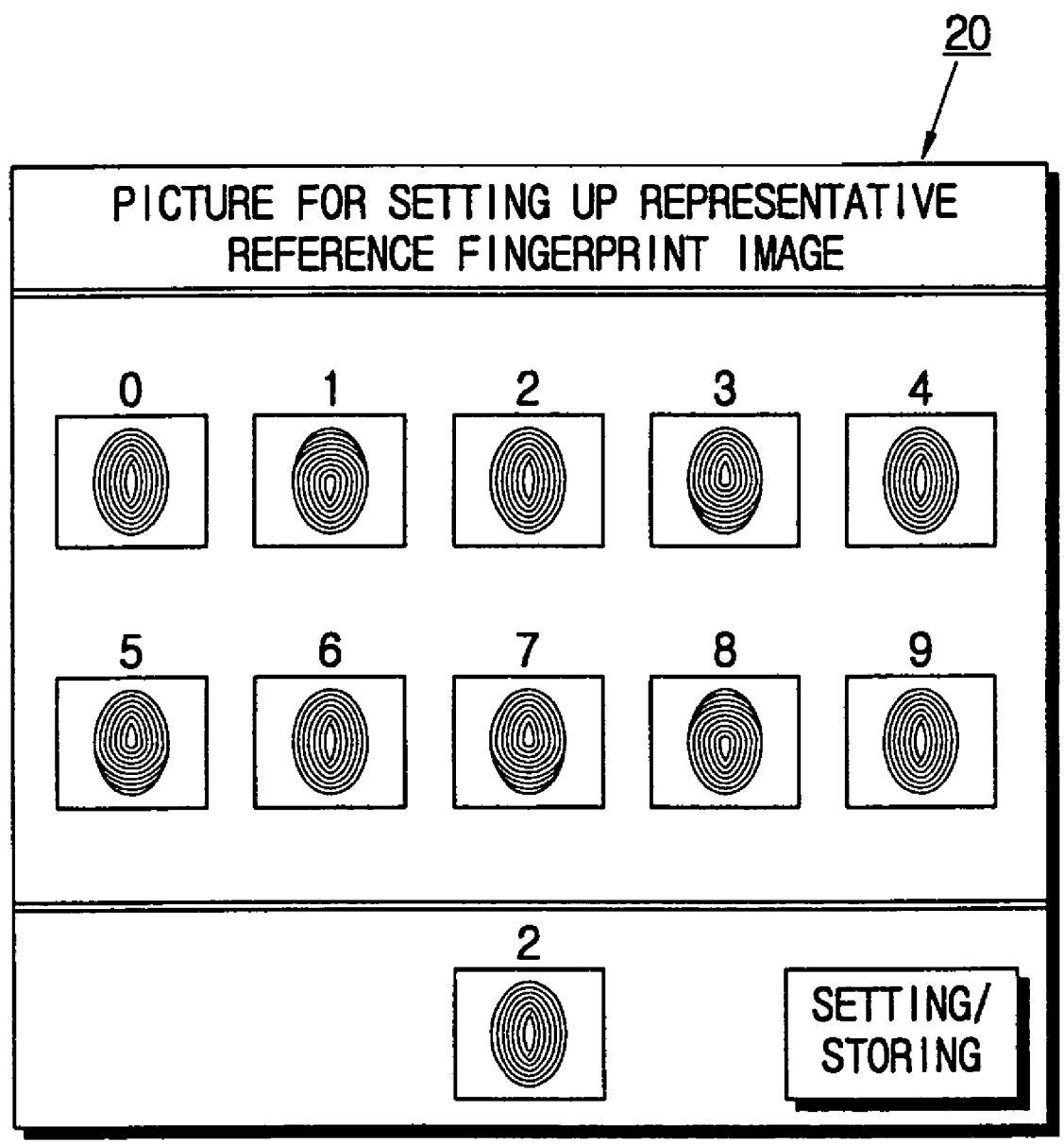
FIG. 5 illustrates fingerprint images and a selected representative reference fingerprint image for a user according to the embodiment of the present invention.
Figure 6:
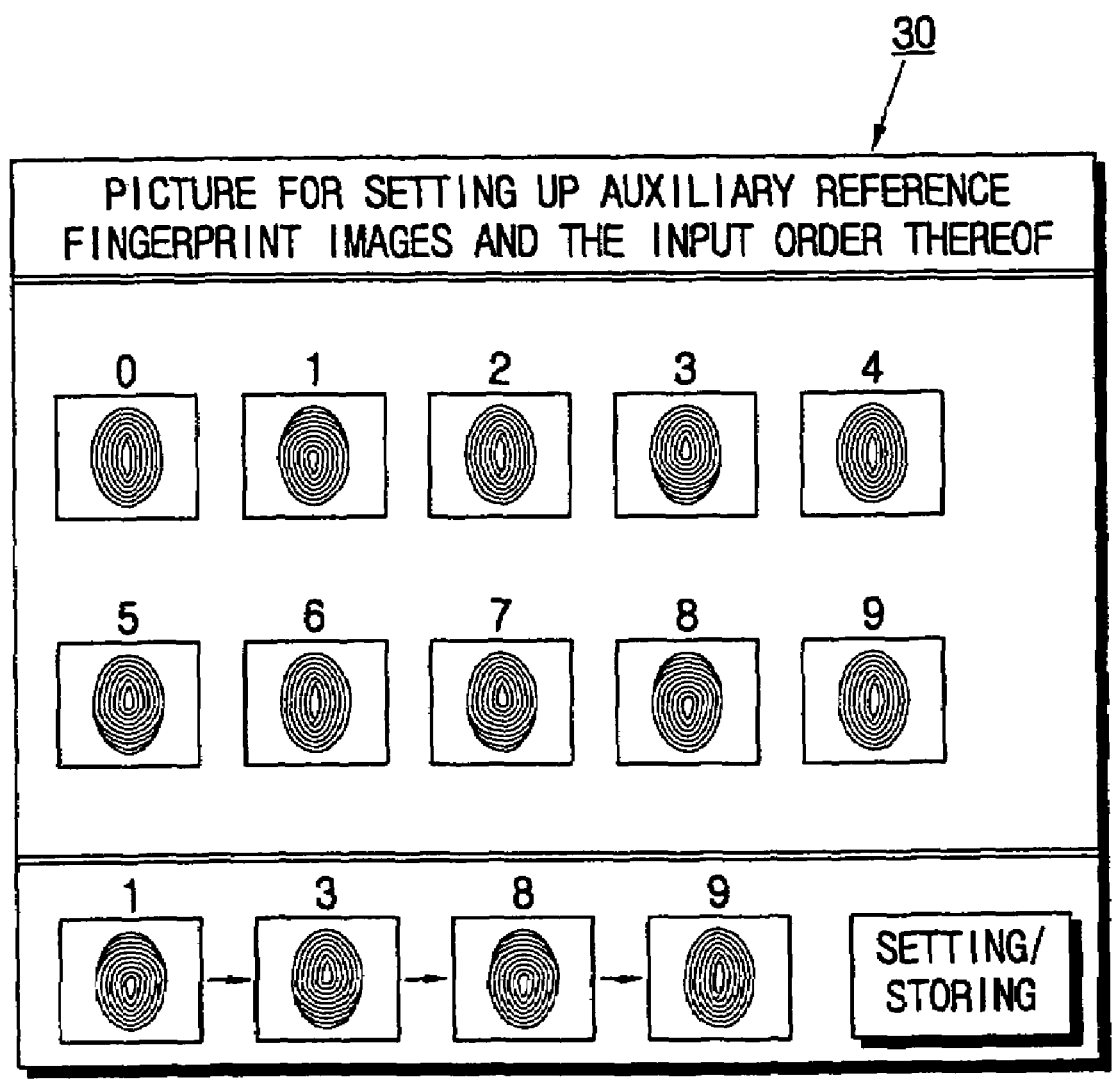
FIG. 6 illustrates auxiliary reference fingerprint images for a user and an input order for comparison of the user's fingerprints, according to the embodiment of the present invention.
Figure 7:
FIG. 7 illustrates a table of the representative reference fingerprint image and the ordered auxiliary reference fingerprint images for each registered user according to the embodiment of the present invention.

FIG. 5 illustrates the screen 20 for setting the representative reference fingerprint image. FIG. 6 illustrates the screen 30 for setting the auxiliary reference fingerprint images and the input order thereof. FIG. 7 illustrates a table 40 of input orders of the representative and auxiliary fingerprint images for registered users. After the multiple unregistered fingerprint images are input, as shown in FIG. 5, the screen 20 for setting the representative reference fingerprint image, which displays the multiple fingerprint images for each of a user's fingers with the specific sequential order values, is displayed on the display part 13. The screen 30 for setting the auxiliary reference fingerprint images and the input order thereof is displayed after the user selects the representative reference fingerprint image. The fingerprint images to be used as the auxiliary reference fingerprint images are selected in a specific order, and the order of the selected fingerprint images is stored in the fingerprint image storing part 9 with the representative reference fingerprint image as the input order information. The selected representative reference fingerprint image and auxiliary reference fingerprint images and the input order thereof are displayed for each registered user in the table 40 shown in FIG. 7 with an ID for each registered user.

In the above embodiment, the fingers of both hands of a user are scanned through the fingerprint detecting part 2 in order and order values are assigned to register the fingerprint images. Alternatively, by using multiple fingerprint input keys having respective fingerprint sensor parts and with assigned order values, a user can combine secret numbers with the fingerprint images to make a secret code.

In the security system of the present invention that allows multiple fingerprints to be registered, an input fingerprint image is compared with multiple stored representative reference fingerprint images, and then stored auxiliary reference fingerprint images corresponding to a representative reference fingerprint image matching the input fingerprint image are compared to additional input fingerprint images to provide user authentication that is fast and convenient.

As described above, according to the present invention, a system and method using fingerprints is provided to enable fast user authentication by comparing a first input fingerprint image with multiple stored representative reference fingerprint images and, if a match occurs, then sequentially performing a comparison for subsequently input fingerprint images with stored auxiliary reference fingerprint images that correspond to the matching representative reference fingerprint image.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A security system using fingerprints, comprising:
    a fingerprint scan part creating a fingerprint image when a finger contacts the fingerprint scan part;
    a fingerprint image storing part storing representative reference fingerprint images for at least two fingers of a user and at least one auxiliary reference fingerprint image for registered users; and
    a control part determining whether one of the representative reference fingerprint images matches a first input fingerprint image input through the fingerprint scan part, reading auxiliary reference fingerprint images corresponding to a matching representative reference fingerprint image, and comparing other fingerprint images input after the first input fingerprint image with the auxiliary reference fingerprint images to determine user authentication.

2. The security system using fingerprints according to claim 1, wherein the control part displays an error message when the first input fingerprint image does not match any of the representative reference fingerprint images in the fingerprint image storing part.

3. The security system using fingerprints according to claim 2, further comprising a fingerprint registering part sequentially storing fingerprint images input through the fingerprint scan part by an unregistered user in the fingerprint image storing part, and displaying the stored fingerprint images of the unregistered user for the unregistered user to select one of the stored fingerprint images as the representative reference fingerprint image.

4. The security system using fingerprints according to claim 3, wherein the fingerprint registering part assigns sequential order values to the unregistered fingerprint images input through the fingerprint scan part and stores the sequential order values with the input fingerprint images of the unregistered user in the fingerprint image storing part.

5. The security system using fingerprints according to claim 3, wherein the fingerprint scan part comprises multiple fingerprint input keys having order values sequentially selected by the unregistered user; and
the fingerprint registering part stores a combination of input fingerprint images contacting the fingerprint input keys selected by the unregistered user and the order values in the fingerprint image storing part.

6. The security system using fingerprints according to claim 4, wherein
the fingerprint registering part displays a screen to set the input order of the auxiliary reference fingerprint images; and
the control part stores the input order of the auxiliary reference fingerprint images in the fingerprint image storing part.

7. A security method using fingerprints, comprising:
storing representative reference fingerprint images and at least one auxiliary reference fingerprint image, according to registered users;
receiving a first input fingerprint image for authentication of a user;
determining whether one of the stored representative reference fingerprint images matches the first input fingerprint image;
reading auxiliary reference fingerprint images corresponding to a matching representative reference fingerprint image;
receiving additional fingerprint images sequentially input by the user; and
determining whether the user is authenticated by respectively comparing the additional input fingerprint images with the corresponding auxiliary reference fingerprint images.

8. The security method using fingerprints according to claim 7, further comprising displaying an error message when the first input fingerprint image does not match any of the representative reference fingerprint images.

9. The security method using fingerprints according to claim 8, further comprising:
receiving fingerprint images of an unregistered user; and
assigning order values to the fingerprint images sequentially input by the unregistered user, and storing the order values with the input fingerprint images.

10. The security method using fingerprints according to claim 9, further comprising displaying a screen for the unregistered user to select one of the stored representative reference fingerprint images as the representative reference fingerprint image.

11. The security method using fingerprints according to claim 10, further comprising:
displaying a screen to select and assign order values to the auxiliary reference fingerprint images; and
storing the selected auxiliary reference fingerprint image and the order values with the selected representative reference fingerprint image.

12. The security method using fingerprints according to claim 8, further comprising:
selecting sequentially two or more fingerprint input keys having order values selected by the unregistered user;
storing a combination of fingerprint images input through the selected fingerprint input keys and the order values; and
determining authentication of a user requesting authentication by determining whether an order of the fingerprint images input through the fingerprint input keys matches the selected order values and whether the input fingerprint images match the stored auxiliary reference fingerprint images.

13. A fingerprint security method, comprising:
receiving and storing fingerprint images for each finger of one or more unregistered users;
displaying the stored fingerprint images for the unregistered user to select one of the stored fingerprint images as a representative reference fingerprint image;
displaying the stored fingerprint images for the unregistered user to select and order one or more of the stored fingerprint images as ordered auxiliary reference fingerprint images;
registering the user with the corresponding representative reference fingerprint image and the auxiliary reference fingerprint images;
receiving a first fingerprint image from a user to be authenticated;
determining whether the first fingerprint image matches any of a plurality of stored representative reference fingerprint images for a plurality of registered users;
receiving, when the first fingerprint image matches one of the stored representative reference fingerprint images, additional fingerprint images sequentially input by the user to be authenticated; and
determining whether each of the additional fingerprint images matches auxiliary reference fingerprint images corresponding to the representative reference fingerprint image that matches the first fingerprint image, and whether the additional fingerprint images are input according to the selected order of the corresponding auxiliary reference fingerprint images.

14. The fingerprint security method according to claim 13, further comprising displaying an error message when the first input fingerprint image does not match any of the representative reference fingerprint images.

* * * * *